United States Patent [19]

Kakugo et al.

[11] Patent Number: 4,786,562
[45] Date of Patent: Nov. 22, 1988

[54] POLYPROPYLENE MULTI-LAYER FILM

[75] Inventors: Masahiro Kakugo, Narashino; Tadatoshi Ogawa; Seiichiro Ima; Teruaki Yoshida, Ichihara, all of Japan

[73] Assignee: Sumitomo Chemical Company, Limited, Osaka, Japan

[21] Appl. No.: 69,223

[22] Filed: Jul. 2, 1987

[30] Foreign Application Priority Data

Jul. 11, 1986 [JP] Japan ............................. 61-164505
May 8, 1987 [JP] Japan ............................. 62-112718

[51] Int. Cl.$^4$ .......................... B32B 27/00; C09J 7/02
[52] U.S. Cl. .................................... 428/516; 428/910; 428/349; 264/176.1
[58] Field of Search ............................. 428/516, 910

[56] References Cited

U.S. PATENT DOCUMENTS

| 4,186,240 | 1/1980 | Matsuda et al. | 428/349 |
| 4,211,852 | 7/1980 | Matsuda et al. | 428/349 |
| 4,339,496 | 7/1982 | Weimer | 428/516 X |
| 4,339,498 | 7/1982 | Weimer | 428/516 X |
| 4,340,640 | 7/1982 | Weimer | 428/516 X |

Primary Examiner—P. C. Ives
Attorney, Agent, or Firm—Stevens, Davis, Miller & Mosher

[57] ABSTRACT

A polypropylene multi-layer film which comprises a crystalline polypropylene substrate layer having laminated to at least one side thereof a sheet of a resin composition comprising:

(A) 10-90% by weight of a propylene random copolymer satisfying that
  (i) the comonomer content is 4-15% by weight,
  (ii) the Vicat softening point is 122° C. or less, and
  (iii) the cold xylene-soluble portion content is 15% by weight or less, (B) 10-90% by weight of a copolymer of propylene and an α-olefin having four or more carbon atoms or a copolymer of propylene, an α-olefin having four or more carbon atoms and ethylene satisfying that:
  (i) the content of the α-olefin having four or more carbon atoms is 8-35 mole %,
  (ii) the ethylene content is 5 mole % or less,
  (iii) the cold xylene-soluble portion content is 15-70% by weight, and
  (iv) the Δhaze is 5% or less, and (C) 0-15% by weight of a highly crystalline polypropylene having a melting point of 150° C. or more.

This polypropylene multi-layer film has an excellent, low-temperature heat sealing property, a good transparency, a good scratch resistance, and so on.

8 Claims, No Drawings

POLYPROPYLENE MULTI-LAYER FILM

This invention relates to a polypropylene multilayer film which has an excellent, low-temperature heat sealing property, a good transparency, a good scratch resistance, and a good hot tack property, contains only a small amount of a solvent-extraction and is suited for food contact uses, for example.

Biaxially-stretched films of crystalline polypropylene films are widely used for packaging by making the best use of the transparency and rigidity thereof. Though such films have a heat sealing property but such films are not generally used without modification since a very high temperature is required for heat sealing the same, and shrinkages or wrinkles are formed. For preference, there are widely used multi-layer films formed by coating on or laminating to one or both sides of the crystalline film a resin capable of being heat sealed at a lower temperature or by coextruding the film and the resin. One of the important characteristics required of this heat sealing resin is that the heat sealing temperature of the film be sufficiently low, because the lower the heat sealing temperature, the higher the possible speed of packaging with the multi-layer film becomes.

However, the mere lowering of heat sealing temperature is not sufficient, and such properties as transparency, scratch resistance and hot tack are, of course, important. And when it is intended to utilize the film for food packaging, the amount of a solvent-extraction must be small. Furthermore, it is desired that properties such as slip, blocking resistance and the like be good.

Although various heat sealing resin have heretofore been proposed, no heat sealing resin has been obtained which meets all the requirements mentioned above. For example, a polypropylene film having laminated thereto polyethylene or an ethylene-vinyl acetate copolymer has a relatively excellent low-temperature heat sealing property, but this property does not reach a satisfactory level, and moreover, the laminated film is inferior in transparency and scratch resistance. The polypropylene resin includes a propylene-ethylene random copolymer in which the bound ethylene content is about 5% by weight; however, this copolymer is greatly inferior in low-temperature heat sealing property and also inferior in hot tack, though it is excellent in transparency, scratch resistance and blocking resistance.

When the bound ethylene content of the propylene-ethylene random copolymer is increased to improve its low-temperature heat sealing property, this property is somewhat improved, but the transparency and blocking resistance are reduced.

Among the polypropylene resins, propylene-butene-1 copolymers have long been known as heat sealing resins (BP-1,018,341, Japanese Patent Application "KOKAI" (Laid-Open) Nos. 128,781/75, 17,542/80, 66,990/79, 114,887/78, 22,307/81 and 166,455/85). However, most of these copolymers are tacky, inferior in blocking resistance, scratch resistance and slip, and the amount of a solvent-extraction is large. Even those which are relatively excellent in transparency, scratch resistance and blocking resistance are still not satisfactory in low-temperature heat sealing property from the view point of the target level of the present inventors.

To overcome these defects, the blending of isotactic polypropylene in a small or large amount with the propylene-butene-1 copolymers is disclosed in Japanese Patent Application "Kokai" (Laid-Open) Nos. 58,861/81, 48,846/79 and 95,684/79. When the amount of the isotactic polypropylene blended is too small, the improvement of blocking resistance and scratch resistance is insufficient, the film obtained is inferior in slip and the amount of the solvent-extraction is large. On the other hand, when said amount is too large, the advantage of low-temperature heat sealing property is reduced, and, in view of the target level of the present inventors, the film obtained still has the problem that it is inferior in blocking resistance, slip and hot tack and contains a large amount of the solvent-extraction.

In view of the above situation, the present inventors have made extensive research aimed at obtaining a polypropylene multi-layer film having an excellent low-temperature heat sealing property, transparency, scratch resistance and hot tack and having a small amount of solvent-extraction, and, preferably also having excellent slip and blocking resistance.

As a result, it has been found that a polypropylene multi-layer film comprising a substrate layer formed of crystalline polypropylene having laminated thereto a binary or a ternary blend composition consisting essentially of specific proportions of (A) a specific propylene random copolymer, (B) a specific copolymer of propylene and an α-olefin having four or more carbon atoms or a specific copolymer of propylene, an α-olefin having four or more carbon atoms and ethylene and optionally (C) a highly crystalline polypropylene has all the properties mentioned above.

According to the present invention, there is provided a polypropylene multi-layer film which comprises a crystalline polypropylene substrate layer having laminated to at least one side thereof a film of a resin composition comprising:

(A) 10–90% by weight of a propylene random copolymer satisfying the following conditions:
  (i) the comonomer content is 4–15% by weight,
  (ii) the Vicat softening point is 122° C. or less, and
  (iii) the cold xylene-soluble portion content is 15% by weight or less, (B) 10–90% by weight of a copolymer of propylene and an α-olefin having four or more carbon atoms or a copolymer of propylene, an α-olefin having four or more carbon atoms and ethylene satisfying the following conditions:
  (i) the content of the α-olefin having four or more carbon atoms is 8–35 mole %,
  (ii) the ethylene content is 5 mole % or less,
  (iii) the cold xylene-soluble portion content is 15–70% by weight, and
  (iv) the Δhaze is 5% or less, and (C) 0–15% by weight of a highly crystalline polypropylene having a melting point of 150° C. or more.

The polypropylene random copolymer (A) [hereinafter referred to as copolymer (A)] used for the composition of the present invention includes known copolymers such as crystalline ethylene-propylene random copolymers, ethylene-butene-1-propylene random terpolymers and the like, and has a comonomer content of 4–15% by weight.

The Vicat softening point of copolymer (A) is 122° C. or less, preferably 120° C. or less. The use of a copolymer having a Vicat softening point over said upper limit causes deterioration in hot tack. Moreover, it becomes necessary to blend a large amount of copolymer (B) in order to reduce the heat sealing temperature to the target level of the present invention, whereby the blocking resistance, scratch resistance, and slip are deteriorated and the amount of solvent-extraction becomes large. The present inventors have surprisingly found that when the Vicat softening point of copolymer (A) is 122° C. or less, the heat sealing temperature of a composition consisting of copolymer (A) and a specific copolymer defined in (B) above becomes much lower than that calculated from the heat sealing temperatures of both on the assumption that an additive effect is obtained from the two.

The amount of the cold xylene-soluble portion of copolymer (A) (hereinafter referred to as CXS) in the present invention is 15% by weight or less, preferably 13% by weight or less, more preferably 10% by weight or less. When the amount of CXS exceeds the said upper limit, the blocking resistance and slip are inferior and the amount of the solvent-extraction becomes large.

A copolymer (B) of propylene and an α-olefin having four or more carbon atoms or of propylene, an α-olefin having four or more carbon atoms and ethylene used in the composition of the present invention [hereinafter referred to as copolymer (B)] can be produced by a solvent polymerization which is done in a solvent medium or a gas phase polymerization. Especially, the gas phase polymerization, in which the polymerization is carried out in the substantial absence of a liquid solvent, is preferred for easy production of the copolymer (B) (having a suitable CXS) and the economical advantages that the step of drying polymer or the step of purifying solvent can be omitted or largely simplified.

The production by the gas phase polymerization can be carried out in a known fluidized bed type reactor, a stirrer-equipped fluidized bed type reactor or the like. It is essential to carry out the polymerization in the reactor under the temperature-pressure conditions that the gas is not liquefied and polymer particles are not melted to form a mass in the reactor. The preferable conditions for the polymerization are such that the temperature range is form 40° to 100° C., preferably b 50° to 80° C., and the pressure range is from 1 to 50 kg/cm² (gauge, hereinafter referred to as G), preferably 2 to 20 kg/cm²G. The addition of a molecular-weight regulator such as hydrogen or the like is preferred to control the melt fluidity of the polymer obtained. The polymerization can be carried out batchwise, continuously or as a combination of both. As the monomers and molecular-weight regulator are consumed during the polymerization, fresh ones starting materials can be fed continuously or intermittently into the reactor. Alternatively, a random copolymerization in which the monomers and comonomers are fed simultaneously in a predetermined proportion can be suitably adopted; however, it is possible to alter the proportion of monomers stepwise or continuously with the lapse of time during the polymerization.

To remove the residues of catalysts or low-molecular weight polymers after the polymerization, the reaction product can be washed with an alcohol, a hydrocarbon solvent or the like.

The catalyst system for the production of the copolymer (B) used in the present invention is a known stereoregular polymerization catalyst for α-olefins, namely, a Ziegler-Natta catalyst consisting essentially of a compound of a transition metal of Groups IV–VIII of the Periodic Table, an organic compound of a typical metal of Groups I–III of the Periodic Table and a third component such as an electron-donating compound or the like. It is preferable that said transition metal compound or the catalyst component containing said transition metal compound is solid.

The transition metal compound, includes $TiCl_3$, which is known to have α, β, γ and δ-type crystal forms. In order to stereoregularly polymerize an α-olefin having three or more carbon atoms, it is preferable to use α, γ or δ-type $TiCl_3$ which has a layer-like crystal structure. $TiCl_3$ is generally obtained in the form of a $TiCl_3$ composition by the reduction of $TiCl_4$ with hydrogen, metallic aluminum, metallic titanium, an organoaluminum compound or an organomagnesium compound. The preferable $TiCl_3$ composition is the so-called $TiCl_3$.AA formed by reducing $TiCl_4$ with metallic aluminum and theh activating it by mechanical grinding or the like. More preferable is a $TiCl_3$ composition formed by reducing $TiCl_4$ with an organoaluminum compound and then activating the same with a complexing agent and a halogen compound. Much more preferably used is a trivalent titanium halide containing an alkoxy group(s) obtained by the reduction of $Ti(OR)_nX_{4-n}$ (wherein R represents a hydrocarbon group having 1–20 carbon atoms, X a halogen and n is an integer of from 0 to 4) with an organoaluminum compound followed by the treatment with an ether compound and $TiCl_4$ The $TiCl_3$ composition or the alkoxycontaining trivalent titanium halide is preferably such that when the polymerization is effected with a combination thereof with diethylaluminum chloride in the presence of hydrogen in liquefied propylene at 65° C. for 4 hours, 6,000 g of polypropylene can be produced per gram of the same. Such a $TiCl_3$ composition can be obtained by a method as disclosed in U.S. Pat. Nos. 4,210,738 and 4,165,298, Japanese Patent Application "Kokai" (Laid-Open) Nos. 142,904/83 and 28,405/85. Alkoxycontaining trivalent titanium halides can also be obtained by a method as disclosed in Japanese Patent Application "Kokai" (Laid-Open) No. 126,401/84 etc.

When the transition metal compound is used as a catalyst component supported on an appropriate carrier, the carrier includes various solid polymers, especially α-olefin polymers; various organic solid compounds, especially solid hydrocarbons; and various inorganic solid compounds, especially oxides, carbonates, halides and the like. Preferable carriers are magnesium compounds such as the halide, oxide, hydroxide and hydroxyhalide of magnesium. The magnesium compound can be utilized as a complex with the other solid materials mentioned above. As the magnesium compounds, commercially available ones may be used as they are; however, preferred are those obtained by mechanical grinding, by dissolving in a solvent followed by precipitation, by treating with an electron-donating compound or a compound having active hydrogen, or by decomposing an organomagnesium compound such as Grignard reagent. In many cases, it is preferable to use a combination of these operations to obtain the preferable magnesium compound. These operations may be previously conducted in the production of the carrier or the production of the catalyst component. Particularly, preferable magnesium compounds are magnesium halides, and particularly preferable transition metal compounds are the above-mentioned titanium halides. The carrier-supported catalyst component comprising titanium, magnesium and halogen as the main ingredients is one of the more preferable catalyst components in this invention, which can be produced by a method as disclosed in Japanese Patent Application "Kokai" (Laid-Open) Nos. 30,407/81 and 59,915/82. Of these, the carrier-supported catalyst component comprising titanium, magnesium and halogen as the main ingredients and containing an electron-donating compound is one of the much more preferable catalyst components in the present invention.

Non-carrier-supported type complex catalyst comprising titanium, magnesium, a halogen and an electron-donating compound as the main ingredients is also one of the much more preferable catalyst components in the present invention, and can be produced by a method as disclosed in Japanese Patent Application No. 59,792/85.

The preferable organic compound of a typical metal of Groups I-III is an organoaluminum compound, especially that represented by the general formula $R_eAlX_{3-e}$ (wherein R represents a hydrocarbon group having 1-20 carbon atoms, X is hydrogen or a halogen and e is a number of from 1 to 3). Such compounds include triethylaluminum, triisobutylaluminum, diethylaluminum hydride, diethylaluminum chloride, diethylaluminum bromide, ethylaluminum sesquichloride, ethylaluminum dichloride and the like. The most preferable compounds are triethylaluminum, diethylaluminum chloride and a mixture thereof.

The electron-donating compounds used in the present invention include esters and anhydrides such as ethyl acetate, ε-caprolactone, methyl methacrylate, ethyl benzoate, p-ethyl anisate, p-methyl toluylate, phthalic anhydride and the like; ethers such as di-n-butyl ether, diphenyl ether, diglyme and the like; and organophosphorus compounds such as tri-n-butyl phosphite, triphenyl phosphite, hexamethylenephosphoric triamide and the like. Also, usable are ketones, amines, amides, thioethers, alkoxysilanes having Si—O—C linkage, organosilicon compounds such as aryloxysilane.

When, for example, the gas phase polymerization is effected, the solid catalyst component may have previously been treated with a small amount of the olefin in the presence of an organoaluminum compound alone or in combination with an electron-donating compound, prior to the polymerization.

In the copolymer (B) contained in the composition of the present invention, an α-olefin having 4 or more carbon atoms or a combination of the α-olefin and a very small amount of ethylene is used as comonomers. The α-olefins having four or more carbon atoms, include butene-1, pentene-1, hexene-1, and 4-methylpentene-1, these may be used alone or inadmixture of two or more. However, when, for example, the gas phase polymerization is intended, butene-1 is most preferable because it is difficult to liquefy and hence a high partial pressure can be used.

The content of the α-olefin having four or more carbon atoms in the copolymer (B) used in the present invention is 8-35 mole %, preferably 10-30 mole %, more preferably 12-28 mole %. When the α-olefin content is less than said lower limit, the improvement in low-temperature heat sealing property of the multi-layer film becomes insufficient. On the other hand, when the α-olefin content is over said upper limit, the blocking resistance, scratch resistance and slip are deteriorated and the amount of the solvent-extraction in the multi-layer film becomes large.

The ethylene content in the copolymer (B) used in the composition of the present invention is 5 mole % or less, preferably 3 mole % or less, more preferably 2.5 mole % or less. When the ethylene content is over said upper limit, the transparency of the multi-layer film is deteriorated with the lapse of time and the blocking resistance and slip are also deteriorated. The reason therefore has not been clarified; however, these deteriorations are considerd to be due to the bleed of atactic component.

The amount of the CXS in the copolymer (B) used in the composition of the present invention is 15-70% by weight, preferably 16-50% by weight, more preferably 16-40% by weight. When the CXS content is lower than said lower limit, the improvement in low-temperature heat sealing property and hot tack of the multi-layer film becomes insufficient. On the other hand, when the CXS content exceeds said upper limit, the blocking resistance, scratch resistance and slip are deteriorated and the amount of the solvent-extraction in the film becomes large.

The Δhaze of the copolymer (B) in the composition used in the present invention is 5% or less, preferably 4% or less, more preferably 3% or less. When the Δhaze is over said upper limit, the improvement in low-temperature heat sealing property of the multi-layer film is insufficient, the transparency is varied with the lapse of time and the blocking resistance and slip are deteriorated.

The amount of the solvent-extraction of the copolymer (B) used in the composition of the present invention is not critical; however, it is preferably 40% by weight or less, more preferably is 20% by weight or less. The use of the copolymer (B) having a smaller amount of the solvent-extraction than said upper limit is advantageous in that the amount of the solvent-extraction of the composition can be reduced as much even if the proportion of the copolymer (B) blended with copolymer (A) is increased.

The high crystalline polypropylene (C) used in the composition of the present invention includes known propylene homopolymers or propylene random copolymers containing an extremely small amount of a comonomer, preferably those having a CXS content of 5% by weight or less. The melting point of said high crystalline polypropylene is 150° C. or more, preferably 155° C. or more. When the melting point is lower than said lower limit, the improvement in blocking resistance and slip of the multi-layer film is poor. The present inventors have surprisingly found that when said highly crystalline polypropylene (C) is added in a small amount, the blocking resistance and slip are greatly improved with almost no adverse effect on transparency and heat sealing temperature.

The composition used in the present invention comprises 10-90% by weight of the copolymer (A), 10-90% by weight of the copolymer (B) and 0-15% by weight of the highly crystalline polypropylene (C), preferably 10-90% by weight of the copolymer (A), 10-90% by weight of the copolymer (B), and 1-15% by weight of the highly crystalline polypropylene (C), more preferably 15-85% by weight of the copolymer (A), 10-85% by weight of the copolymer (B) and 2-10% by weight of the highly crystalline polypropylene (C).

When the proportion of the copolymer (A) blended is over said upper limit, the proportion of the copolymer (B) blended becomes necessarily decreased as mush and, as a result, the target level of low-temperature heat sealing property of the multi-layer film cannot be attained. When the proportion of the copolymer (A) blended is lower than said lower limit, the proportion of the copolymer (B) blended and the amount of the solvent-extraction becomes necessarily increased as much.

When the proportion of the copolymer (B) blended is over said upper limit, the blocking resistance and slip are deteriorated and the amount of the solvent-extraction is increased even if the highly crystalline polypropylene (C) is added. On the other hand, when the proportion of the copolymer (B) blended is lower than said lower limit, the target level of the low-temperature heat sealing property of the multi-layer film cannot be attained.

When the proportion of the highly crystalline polypropylene (C) exceeds said upper limit, the low-temperature heat sealing property and transparency are deteroriated. The proportion of the highly crystalline polypropylene (C) blended may be zero; however, in such a case, the improvement in blocking resistance and slip is not so great, and hence, it is preferable to blend the same in an amount lower than said upper limit.

The preferable range of the melt index (g/10 min) of the composition is 0.5–10 g/10 min. A composition having a melt index lower than said lower limit is unsuitable because of its poor processability, whereas a composition having a melt index over said upper limit is also unsuitable because of its low heat sealing strength.

It is preferable for the above-mentioned composition to have a main peak appearing in the range of from 127° to 140° C. and a subpeak appearing in each of the ranges of from 95° to 127° C. and from 147° to 160° C. on a fusion curve as measured by DSC. The absence of subpeak between 95° C. and 127° C. is unsuitable because the low-temperature heat sealing property is poor, whereas the absence of subpeak between 147° C. and 160° C. causes little improvement in blocking resistance and slip.

In the present invention, the above-mentioned composition can be obtained by a homogeneous dispersion according to any known method, for example, the melt-extrusion blending or the Banbury blending. Also, it can be obtained by so-called multi-step polymerization, in which the polymerization conditions are stepwise changed.

Additives such as antistatic agent, antiblocking agent, slipping agent, stabilizer and nucleus forming agent can be added to the composition of the preseht invention.

A polypropylene multi-layer film of the present invention can be obtained by laminating the above-mentioned heat sealing resin composition to one or both sides of the crystalline polypropylene film as a substrate according to any known method. That is, the multilayer film of the present invention can be obtained by passing a substrate film and a sheet made of a heat sealing resin layer with an adhesive through between pressure rollers; by coating the substrate film with a heat sealing resin in the form of a solution in a solvent such as toluene or the like or a dispersion; by melt-extruding and coating a heat sealing resin on the substrate film; or by extruding a heat sealing resin and a substrate polymer by respective extruders followed by joining the two in the molten state in the common die or at the exit.

It is preferable that the heat seal layer of the multilayer film of the present invention is stretched in at least one direction. The stretched polypropylene multi-layer film is obtained according to the following known method:

1. A method consisting of the steps of producing an original laminate sheet by the so-called co-extruding that the substrate and the resin composition are joined in a molten state in the die or near the exit, and biaxially stretching the same.

2. A method consisting of the steps of extrusion-laminating the heat sealing resin to the polypropylene substrate sheet and biaxially stretching the same.

3. A method consisting of the steps of extrusion-laminating the heat sealing resin to the polypropylene substrate sheet previously stretched in the machine direction uniaxially in a heated state by a group of rollers containing one or more pairs of metal rollers and stretching the same in the transverse direction.

The polypropylene multi-layer film thus obtained has not only a remarkably excellent low-temperature heat sealing property but also an excellent transparency, scratch resistance and hot tack, and a small amount of the solvent-extraction. It is suited for, for example, food contact uses. Further, in a more preferable mode, it also has an excellent slip and blocking resistance. It has the markedly great practical value that the production cost is low.

The data and valuations in the following Examples and Comparative Examples were obtained as follows:

(1) α-olefin content in copolymer

α-olefin content in copolymer was estimated from the material balance. As to butene-1 content, the result from the material balance was confirmed by the conventional measurement using the infrared spectrophotometer with the characteristic absorption at 770 $cm^{-1}$. The measurement was carried out by utilizing the analytical curve obtained by the quantitative data of propylene-butene-1 copolymer by $^{13}$C-NMR.

(2) Ethylene content in copolymer

Ethylene content in copolymer was estimated from the material balance. The result was confirmed by the conventional measurement using the infrared spectrophotometer with the characteristic absorption at 732 and 720 $cm^{-1}$. The measurement was carried out by utilizing the analytical curve obtained by the quantitative data of the radiation measurement of $^{14}$C-labelled ethylene copolymer.

(3) Melt index (MI)

The melt index was measured in accordance with ASTM-D1238.

(4) Vicat softening point (VSP)

The Vicat softening point was measured in accordance with ASTM-D1525.

(5) Cold xylene-soluble content (CXS)

5g of polymer was dissolved in 500 ml of xylene, and then was cooled gradually to the room temperature. After allowing it stand in a bath at 20° C. for four hours, it was filtered. The filtrate was concentrated, dried up and weighed.

(6) Intrinsic viscosity ([η])

Viscosities were measured with a conventional method in tetralin at 135° C. on diluted samples having a concentration of 0.4, 0.2, 0.133 or 0.1 g/dl.

(7) ΔHaze

The ΔHaze was indicated by the difference between the haze values before and after the annealing of the press sheet of the copolymer having a thickness of 100μ for 9 hours at 60° C.

(8) Amount of solvent-extraction

The amount of solvent-extraction was indicated by the amount of material extracted with n-hexane at 50° C. prescribed in FDA § 177.1520. (9) Melting point (Tm)

The melting point was measured by the differential scanning calorimeter. After the annealing of the samples for 5 minutes at 200° C. followed by the cooling and solidification at the rate of 10° C./min, the measurement was carried out in the condition of increasing rate of 20° C./min.

As the data of the melting point, not only the temperature giving the highest peak (main peak temperature) but also the temperatures giving definitely the maximum peaks (subpeak temperatures) were described.

(10) Haze

The haze was measured in accordance with ASTMD1003.

(11) Heat sealing temperature

Two portions of the films were superposed face to face and pressure-bound by means of heat sealer heated at a prescribed temperature under a load of 2 kg/cm$^{-2}$G for 2 seconds to obtain a specimen of 25 mm width. The peeling resistance of this specimen was measured under the condition of peeling velocity of 200 mm/min. and peeling angle of 180°. The temperature when the peeling resistance reached 300 g/25 mm was defined as the heat sealing temperature.

(12) Slip ($\mu_S/\mu_K$)

The slip was measured in accordance with ASTM-D1894. ($\mu_S$: coefficient of static friction, $\mu_K$: coefficient of kinetic friction)

(13) Blocking

A specimen suffered blocking by treating it at 60° C. for 3 hours under a load of 500 g/12 cm$^{-2}$. Then the specimen was subjected to a shear tensile test to determine the largest load (kg) to peel the specimen and it was indicated by unit of kg/12 cm$^2$.

(14) Scratch resistance

The degree of scratch was indicated by three grades (O, Δ, X).

The present invention will be further illustrated below with reference to Examples and Comparative Examples to be more clearly understood. However, the Examples and the Comparative Examples are not by way of limitation but by way of illustration.

EXAMPLE 1

(1) Synthesis of solid product

Atmosphere in a 500 ml-flask equipped with a stirrer and a dropping funnel was replaced with argon. Then there were charged 83 ml of n-heptane, 16.1 ml of titanium tetrachloride and 51.0 ml of titanium tetra-n-butoxyde. With stirring, the temperature of the mixture in the flask was kept at 20° C. A solution consisting of 162.1 ml of n-heptane and 37.8 ml of diethylaluminum chloride was gradually fed by the dropping funnel for 3 hours maintaining the temperature of the mixture in the flask at 20° C. After the completion of the feed, the temperature was raised up to 50° C. and the mixture in the flask was stirred for an hour. Then the flask was allowed to stand at room temperature to separate solid from liquid. After washing the solid four times with 200 ml of n-heptane, it was dried under reduced pressure to obtain 64.7 g of red brown solid product.

(2) Synthesis of preliminarily polymerized solid

Atmosphere in a stirrer-equipped 300 ml-flask was replaced with argon. Then there were charged 241 ml of n-heptane, 0.34 g of triethylaluminum and 19.7 g of solid product prepared in above (1) with maintaining the temperature of the suspension at 50° C. With stirring the suspension, ethylene was gradually fed keeping its partial pressure of 0.2 kg/cm$^2$ to the suspension for 20 minutes at 50° C. to carry out the preliminary polymerization treatment. After the completion of the treatment, solid was separated from liquid. The solid was washed twice with 50 ml of n-heptane, then dried under reduced pressure. 0.09 g of preliminarily polymerized solid was obtained per gram of the solid product.

(3) Synthesis of solid catalyst component

Atmosphere in 100 ml-flask was replaced with argon. Then, 12.1 g of the preliminarily polymerized solid prepared in above (2) and 42.3 ml of n-heptane were charged into the flask, and the temperature thereof was kept at 30° C. Next, 14.4 ml of di-isoamyl ether was added thereto. After the mixture was treated at 30° C. for an hour, the temperature thereof was raised up to 75° C. Then, 15.7 ml of titanium tetrachloride was added, and the reaction was carried out at 75° C. for an hour. The resulting solid was separated from liquid. The solid was washed four times with 50 ml of n-heptane, then dried under reduced pressure to obtain a solid component. Further, atmosphere in 100 ml-flask was replaced with argon, and then 9.9 g of the above solid component and 38 ml of n-heptane were charged thereto, and the temperature thereof was kept at 30° C. Next, 8.5 ml of di-isoamyl ether was added thereto. After the treatment at 30° C. for an hour, the temperature was raised up to 75° C. Then, 11.5 ml of titanium tetrachloride was added thereto and the reaction was carried out at 75° C. for an hour. The resulting solid was separated from liquid. The solid was washed four times with 50 ml of n-heptane, then dried under reduced pressure to obtain a solid catalyst component.

(4) Copolymerization [Copolymer (B)]

Copolymerization of propylene and butene-1 was carried out utilizing a stirrer-equipped fluid bed reactor having an internal volume of 1 m$^3$ as follows. 60 kg of particles of propylene-butene-1 copolymer for dispersing catalyst was fed into the reactor, then the atmosphere thereof was replaced with nitrogen and then with propylene. The pressure was raised by injecting propylene up to 5 kg/cm$^2$G. To the bottom of the reactor, recycling gas was fed at a flow rate of 80 m$^3$/hr to maintain the polymer particles to be in flux. Then the following catalysts were charged into the reactor.

| (a) solid catalyst component | 21 g |
|---|---|
| (b) diethylaluminum chloride | 156 g |
| (c) triethylaluminum | 22 g |
| (d) methyl methacrylate | 15 g |

Catalyst components (b) and (c) diluted with heptane were used. Then hydrogen, propylene and butene were fed so as to give a hydrogen concentration of 1.7% by volume and a butene-1 concentration of 29% by volume. And the total pressured was raised up to 10 kg/cm$^2$G. Controlling the temperature of the fluidized bed at 70° C., the polymerization was started. During the polymerization, hydrogen, propylene and butene-1 were fed so as to maintain the constant concentrations and partial pressures of hydrogen and butene-1. When the amount of polymerized polymer reached to 75 kg, the polymer particles in the reactor, except 60 kg thereof for the catalyst dispersion for the next polymerization, were transferred into vessel. Then it was dried to obtain white powdery polymer. The same polymerization was repeated three times, and the characteristics of the polymer obtained in the third polymerization [Copolymer (B)] were evaluated. The results were that butene-1 content was 20.3 mole %, the CXS content was 23.9%, Δhaze was 0.9%, the amount of solvent-extraction was 7.3% and the intrinsic viscosity was 1.8 dl/g.

(5) Preparation of composition
1 Copolymer (A)

Sumitomo Noblen®RW160 (a registered trade mark, mfd. by Sumitomo Chemical Co., Ltd.) was used. It had an ethylene content of 4.8% by weight, a Vicat softening point of 118° C., a melt index of 8.8 g/10 min. and a CXS content of 4.3%.

② highly crystalline polypropylene (C)

Sumitomo Noblen® HS200A (a registered trade mark, mfd. by Sumitomo Chemical Co., Ltd.) was used. It had a melting point of 161° C., a melt index of 1.8 g/10 min. and a CXS content of 2.8%.

65% by weight of above copolymer (A), 30% by weight of copolymer (B) obtained in (4) and 5% by weight of above highly crystalline polypropylene (C) were meltblended uniformly with a 65 mmφ extruder. Thereto were added 0.2 PHR of BHT as anti-oxidant, 0.2 PHR of silica as anti-blocking agent and 0.2 PHR of stearic acid amide as slipping agent.

(6) Lamination and stretching

The composition obtained in (5) was laminated to a homopolypropylene sheet having a thickness of 500μ by press molding so that the layer of the composition gives a thickness of 100μ. (The thickness of the multi-layer sheet was 600μ).

Then, a specimen 90 mm square taken from the said multi-layer sheet was subjected to a stretching under the following conditions to obtain a biaxial-stretched film.

Stretching machine: bench biaxial stretching machine mfd. by Toyo Seiki Co., Ltd.
Temperature: 150° C.
Preheating time: 3 min.
Stretching ratio: 5 times for the machine direction 5 times for the transverse direction
Stretching velocity: 5 m/min.

The properties of the above-obtained multi-layer stretched film having a thickness of about 24μ are shown in Table 1. This multi-layer stretched film had not only a remarkably low heat sealing temperature but also an excellent transparency, slip, blocking resistance and scratch resistance.

EXAMPLES 2, 3 and 4

Using the copolymer (A), copolymer (B) and highly crystalline polypropylene (C) as same as in Example 1, multi-layer stretched films were obtained under the same conditions as in Example 1 except that the proportions in the compositions were altered. The proportions are shown in Table 1.

These multi-layer stretched films had excellent porperties as in Example 1.

EXAMPLE 5

(1) Polymerization of copolymer (B)

Using the same catalyst system as in Example 1, a copolymer was obtained under the same polymerization conditions as in Example 1 except that the charged amounts of butene-1 and so on were altered. The obtained copolymer (B) had the butene-1 content of 15.8 mole %, the CXS content of 19.5% by weight, Δhaze of 0.4%, the amount of solvent-extraction of 6.2% and the intrinsic viscosity of 1.8 dl/g.

(2) Preparation of composition and production of multi-layer film
1 Copolymer (A)

Sumitomo Noblen® FL6711N (a registered trade mark, mfd. by Sumitomo Chemical Co., Ltd.) was used.

It has an ethylene content of 6.2% by weight, a Vicat softening point of 109° C., a melt index of 5.5 g/10 min. and a CXS content of 9.5%.

2 Highly crystalline polypropylene (C)

The same highly crystalline polypropylene as in Example 1 was used.

A multi-layer stretched film was obtained under the same conditions as in Example 1 except that 15% by weight of above copolymer (A), 75% by weight of copolymer (B) obtained in (1) and 10% by weight of above highly crystalline polypropylene (C) were compounded.

This multi-layer stretched film had excellent properties as in Example 1.

EXAMPLE 6

Using the copolymer (A), the copolymer (B) and the highly crystalline polypropylene (C) as same as in Example 5, a multi-layer stretched film was obtained under the same conditions as in Example 1 except that the proportion of the composition was altered. The proportion is shown in Table 1.

This multi-layer stretched film had excellent properties as in Example 1.

EXAMPLE 7

(1) Polymerization of copolymer (B)

Using the catalyst system as same as in Example 1, a copolymer was obtained under the same polymerization conditions as same as in Example 1 except that the charged amount of butene-1 were altered and that the pressure at the polymerization was altered to 7 kg/cm$^2$G. The copolymer (B) obtained had the butene-1 content of 25.1 mole %, the CXS content of 35.1% by weight, the Δhaze of 1.6%, the amount of solvent-extraction of 15.5% and the intrinsic viscosity of 2.0 dl/g.

(2) Preparation of composition and production of multi-layer film
① Copolymer (A)

The same copolymer as in Example 1 was used.
② Highly crystalline polypropylene (C)

The same highly crystalline polypropylene as in Example 1 was used.

A multi-layer stretched film was obtained under the same conditions as same as in Example 1 except that 81% by weight of above copolymer (A), 15% by weight of copolymer (B) obtained in (1) and 4% by weight of above highly crystalline polypropylene (C) were compounded. This multilayer stretched film had excellent properties as in Example 1.

EXAMPLE 8

(1) Polymerization of copolymer (B)

Using the same catalyst system as in Example 1 except that triethylaluminum was not contained and that the amount used of methyl methacrylate was decreased to 8 g, a copolymer was obtained under the same polymerization conditions as in Example 1 except that the charged amount of butene-1 was altered and that ethylene was newly introduced into the reaction. The obtained copolymer (B) had the butene-1 content of 16.1 mole %, the ethylene content of 2.0 mole %, the CXS content of 24.5%, the Δhaze of 1.3%, the amount of solvent-extraction of 12.5% and the intrinsic viscosity of 2.0 dl/g.

(2) Preparation of composition and production of multi-layer film

① Copolymer (A)

The same copolymer as in Example 1 was used.

② Highly crystalline polypropylene (C)

The same highly crystalline polypropylene as in Example 1 was used. A multi-layer stretched film was obtained under the same conditions as in Example 1 except that 65% by weight of above copolymer (A), 30% by weight of copolymer (B) obtained in (1) and 5% by weight of above highly crystalline polypropylene (C) were compounded. This multi-layer film had excellent properties as in Example 1.

EXAMPLE 9

Using the copolymer (A) and copolymer (B) as same as in Example 1, a multi-layer stretched film was obtained under the same conditions as in Example 1 except that the proportion of the composition was altered.

This composition had a low amount of solvent-extraction and the multi-layer stretched film comprising this composition had an excellent transparency, low-temperature heat sealing property and scratch resistance.

EXAMPLE 10

(1) Polymerization of copolymer (B)

Using the same catalyst system as in Example 1, a copolymer was obtained under the same polymerization conditions as those in Example 1 except that 4-methyl-1-pentene was newly added and the charged monomer proportions were changed. The content of an α-olefin in the copolymer was 17.1 mole % (content of butene-1, 14.0 mole %; content of 4-methyl-1-pentene, 3.1 mole %), the CXS was 26.3% by weight, the Δhaze of 0.4%, the amount of solvent-extraction of 8.5% and the intrinsic viscosity of 1.8 dl/g.

(2) Preparation of composition and production of multilayer film

① Copolymer (A)

The same copolymer as in Example 1 was used.

② Highly crystalline polypropylene (C)

The same highly crystalline polypropylene as in Example 1 was used.

A multi-layer stretched film was obtained under the same conditions as in Example 1 except that 65% by weight of above copolymer (A), 30% by weight of copolymer (B) obtained above in (1) and 5% by weight of above highly crystalline polypropylene (C) were compounded. This multi-layer film had excellent properties as in Example 1.

COMPARATIVE EXAMPEL 1

Using the same copolymer (A), copolymer (B) and highly crystalline polypropylene (C) as in Example 1, a multi-layer stretch film was obtained under the same conditions as in Example 1 except that the proportion of the composition was altered. The proportion is shown in Table 1. This multi-layer film was not only unsatisfactory in low-temperature heat sealing property but also unsuitable in transparency.

COMPARATIVE EXAMPLE 2

(1) Preparation of composition and production of multi-layer film

① Copolymer (A)

Sumitomo Noblen® RW140 (a registered trade mark, mfd. by Sumitomo Chemical Co., Ltd.) was used. It had the ethylene content of 3.7% by weight, the Vicat softening point of 125° C., the melt index of 8.3 g/10 min. and the CXS content of 3.8%.

② Copolymer (B) and highly crystalline polypropylene (C)

Those which are the same as in Example 1 were used.

A multi-layer stretched film was obtained under the same conditions as in Example 1 except that 75% by weight of above copolymer (A), 20% by weight of above copolymer (B) and 5% by weight of above highly crystalline polypropylene (C) were compounded. It was evident that this multi-layer stretched film was greatly inferior in low-temperature heat sealing property compared with that in Example 2. From this fact, it is clear that a very unique effect is caused only by compounding copolymer (A) within the range defined in the present invention.

COMPARATIVE EXAMPLE 3

(1) Preparation of composition and production of multi-layer film

① Copolymer (A)

Sumitomo Noblen® RW120 (a registered trade mark, mfd. by Sumitomo Chemical Co., Ltd.) was used. It had the ethylene content of 2.3% by weight, the Vicat softening point of 137° C., the melt index of 9.1 g/10 min. and the CXS content of 3.2%.

② Copolymer (B)

Tafmer® XR110T (a registered trade mark, mfd. by Mitsui Petrochemical Industries Ltd.), a propylene-butene-1 random copolymer, was used. It had the butene-1 content of 26.5 mole %, the CXS content of 62%, the Δhaze of 2.5%, the amount of solvent-extraction of 69% by weight and the intrinsic viscosity of 1.8 dl/g.

A multi-layer stretched film was obtained under the same conditions as in Example 1 except that 40% by weight of above copolymer (A) and 60% by weight of abov copolymer (B) were compounded. This film was unsuitable because it was inferior in scratch resistance and the amount of solvent-extraction of the composition was very large though it is satisfactory in low-temperature heat sealing property.

COMPARATIVE EXAMPLE 4

(1) Preparation of composition and production of multi-layer film

① Copolymer (A) and copolymer (B)

Those which are the same as in Example 1 were used.

A multi-layer stretched film was obtained under the same conditions as in Example 1 except that 95% by weight of above copolymer (A) and 5% by weight of above copolymer (B) were compounded. This multi-layer stretched film was unsuitable because of its poor low-temperature heat sealing property.

COMPARATIVE EXAMPLE 5

(1) Preparation of composition and production of multi-layer film

① Copolymer (A)

The same copolymer (A) as in Example 1 was used.

② Copolymer (B)

A propylene-butene-1 copolymer obtained by the slurry polymerization using n-heptane as a solvent followed by reducing n-heptane soluble parts was used. It had the butene-1 content of 15.1 mole %, the CXS content of 10.1% by weight, the Δhaze of 0.5%, the amount of solvent-extraction of 3.0% by weight and the intrinsic viscosity of 1.9 dl/g.

A multi-layer film was obtained under the same conditions as in Example 1 except that 70% by weight of above copolymer (A) and 30% by weight of above copolymer (B) were compounded. This multi-layer film was unsuitable because of its poor low-temperature heat sealing property

COMPARATIVE EXAMPLE 6

Using the same copolymer (B) as used in Example 5 alone, a multi-layer stretched film was obtained under the same conditions as in Example 1. This copolymer (B) had so large amount of solvent-extraction that it did not meet the object of the present invention.

COMPARATIVE EXAMPLE 7

Using the same copolymer (A) as used in Example 1 alone, a multi-layer stretched film was obtained under the same conditions qs in Example 1. This multi-layer film had an extremely poor low-temperature heat sealing property.

COMPARATIVE EXAMPLE 8

(1) Polymerization of copolymer (B)

Using the same catalyst system as in Example 1, a copolymer was obtained under the same polymerization conditions as those in Example 1 except that the charged amount of butene-1 was altered and that ethylene was newly introduced into the reaction. The obtained copolymer (B) had the butene-1 content of 8.1 mole %, the ethylene content of 6.1 mole %, the CXS content of 22.5%, the Δhaze of 8.3%, the amount of solvent-extraction of 8.5% by weight and the intrinsic viscosity of 1.7 dl/g.

(2) Preparation of composition and production of multilayer film

1 Copolymer (A)

The same copolymer as in Example 5 was used.

2 Highly crystalline polypropylene (C)

The same highly crystalline polypropylene as in Example 1 was used.

A multi-layer stretched film was obtained under the same conditions as in Example 1 except that 15% by weight of above copolymer (A), 75% by weight of copolymer (B) obtained above in (1) and 10% by weight of above highly crystalline polypropylene (C) were compounded. The transparency of this multi-layer stretched film became worse in the passage of time. Moreover, it was inferior in low-temperature heat sealing property, slip and blocking resistance.

TABLE 1

|  |  | Example 1 | Example 2 | Example 3 | Example 4 | Example 5 | Example 6 | Example 7 | Example 8 | Example 9 | Example 10 | Comparative Example 1 |
|---|---|---|---|---|---|---|---|---|---|---|---|---|
| proportion (wt %) | (A) | 65 | 75 | 37 | 78 | 15 | 70 | 81 | 65 | 70 | 65 | 27 |
|  | (B) | 30 | 20 | 55 | 20 | 75 | 25 | 15 | 30 | 30 | 30 | 55 |
|  | (C) | 5 | 5 | 8 | 2 | 10 | 5 | 4 | 5 | 0 | 5 | 18 |
| properties of composition | MI (g/10 min.) | 7.7 | 8.1 | 6.8 | 8.2 | 5.4 | 8.0 | 8.5 | 7.2 | 7.9 | 7.8 | 4.9 |
|  | amount of solvent extraction (wt %) | 1.6 | 1.4 | 2.9 | 1.4 | 3.9 | 2.3 | 1.8 | 2.9 | 2.1 | 2.0 | 2.5 |
|  | melting point (°C.) | 109 | 111 | 108 | 110 | 115 | 115 | 112 | 108 | 109 | 108 | 115 |
|  |  | 140 | 139 | 139 | 138 | 146 | 141 | 139 | 139 | 138 | 142 | 148 |
|  |  | 150 | 150 | 151 | 148 | 155 | 152 | 149 | 150 |  | 151 | 156 |
| properties of multilayer film | haze (%) | 1.0 | 1.1 | 1.4 | 0.7 | 1.5 | 1.1 | 0.9 | 1.0 | 0.7 | 1.2 | 3.5 |
|  | heat sealing temperature (°C.) | 90 | 99 | 86 | 98 | 95 | 100 | 93 | 89 | 89 | 91 | 104 |
|  | μs/μk | 0.81/0.84 | 0.75/0.78 | 0.87/0.89 | 0.88/0.90 | 0.69/0.72 | 0.80/0.80 | 0.90/0.92 | 0.85/0.89 | >1.6/>1.6 | 0.85/0.88 | 0.5/0.53 |
|  | blocking (kg/12 cm²) | 0.19 | 0.13 | 0.25 | 0.34 | 0.10 | 0.18 | 0.32 | 0.22 | >2.0 | 0.21 | <0.1 |
|  | scratch resistance | ○ | ○ | ○ | ○ | ○ | ○ | ○ | ○ | ○ | ○ | ○ |

|  |  | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| proportion (wt %) | (A) | 75 | 40 | 95 | 70 | 0 | 100 | 15 |
|  | (B) | 20 | 60 | 5 | 30 | 100 | 0 | 75 |
|  | (C) | 5 | 0 | 0 | 0 | 0 | 0 | 10 |
| properties of composition | MI (g/10 min.) | 7.9 | 7.6 | 8.6 | 7.5 | 5.5 | 8.8 | 7.5 |
|  | amount of solvent extraction (wt %) | 1.3 | 10.2 | 1.2 | 1.4 | 6.2 | 1.1 | 4.9 |
|  | melting point (°C.) | 117 | 111 | 137 | 112 | 107 | 137 | 118 |
|  |  | 145 | 148 |  | 139 | 136 |  | 140 |
|  |  | 152 |  |  |  | 146 |  | 154 |
| properties of multilayer film | haze (%) | 1.2 | 0.7 | 0.8 | 0.7 | 1.3 | 0.7 | 2.5 |
|  | heat sealing temperature (°C.) | 121 | 89 | 125 | 115 | 92 | 131 | 110 |
|  | μs/μk | 0.71/0.75 | >1.6/>1.6 | 1.5/1.4 | 1.2/1.2 | 1.5/1.5 | 1.4/1.3 | 1.5/1.4 |
|  | blocking (kg/12 cm²) | 0.12 | >2.0 | 0.51 | 0.65 | 0.71 | 0.35 | >2.0 |
|  | scratch resistance | ○ | Δ | ○ | ○ | ○ | ○ | ○ |

What is claimed is:

1. A polypropylene multi-layer film which comprises a crystalline polypropylene substrate layer having laminated to at least one side thereof a sheet of a resin composition consisting essentially of:

(A) 10–90% by weight of a propylene random copolymer satisfying that:
  (i) the comonomer content is 4–15% by weight,
  (ii) the Vicat softening point is 122° C. or less, and
  (iii) the cold xylene-soluble portion content is 15% by weight or less, (B) 10–90% by weight of a copolymer of propylene and an α-olefin having four or more carbon atoms or a copolymer of propylene, an α-olefin having four or more carbon atoms and ethylene satisfying that:
  (i) the content of the α-olefin having four or more carbon atoms is 8–35 mole %,
  (ii) the ethylene content is 5 mole % or less,
  (iii) the cold xylene-soluble portion content is 15–70% by weight, and
  (iv) the Δhaze is 5% or less, and (C) 0–15% by weight of a highly crystalline polypropylene having a melting point of 150° C. or more.

2. A polypropylene multi-layer film according to claim 1, wherein the amount of the solvent-extraction in the copolymer (B) is 40% by weight or less.

3. A polypropylene multi-layer film according to claim 1, wherein the resin composition comprises 10–90% by weight of the copolymer (A), 10–90% by weight of the copolymer (B) and 1–15% by weight of the highly crystalline polypropylene (C).

4. A polypropylene multi-layer film according to claim 3, wherein the resin composition has the main peak appearing in the range of from 127° to 147° C. and a subpeak appearing in each of the ranges of from 95° to 127° C. and from 147° to 160° C. on a fusion curve as measured by DSC.

5. A polypropylene multi-layer film according to claim 1, wherein the α-olefin of the copolymer (B) is at least one compound selected from the group consisting of butene-1, pentene-1, hexene-1 and 4-methylpentene-1.

6. A polypropylene multi-layer film according to claim 5, wherein the α-olefin of the copolymer (B) is butene-1.

7. A polypropylene multi-layer film according to claim 1, wherein said multi-layer film is stretched in at least one direction.

8. A polypropylene multi-layer film according to claim 7, wherein said multi-layer film is stretched biaxially.

* * * * *